Dec. 2, 1958   L. OCHTMAN   2,862,374
TORQUE LIMITING DEVICE
Filed April 5, 1957   2 Sheets-Sheet 1
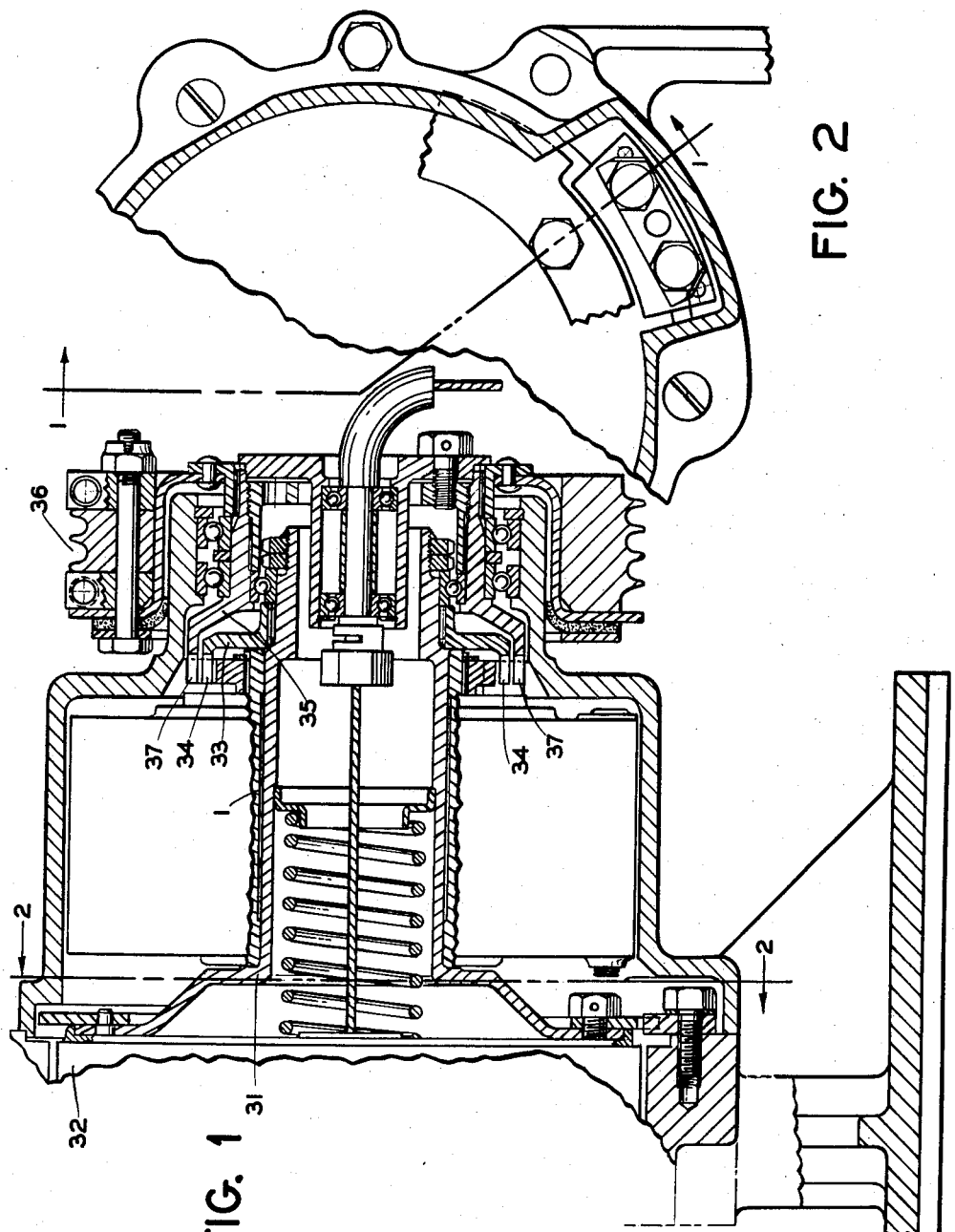
INVENTOR.
LEONARD OCHTMAN
BY
ATTORNEY Dec. 2, 1958  L. OCHTMAN  2,862,374
TORQUE LIMITING DEVICE
Filed April 5, 1957  2 Sheets-Sheet 2
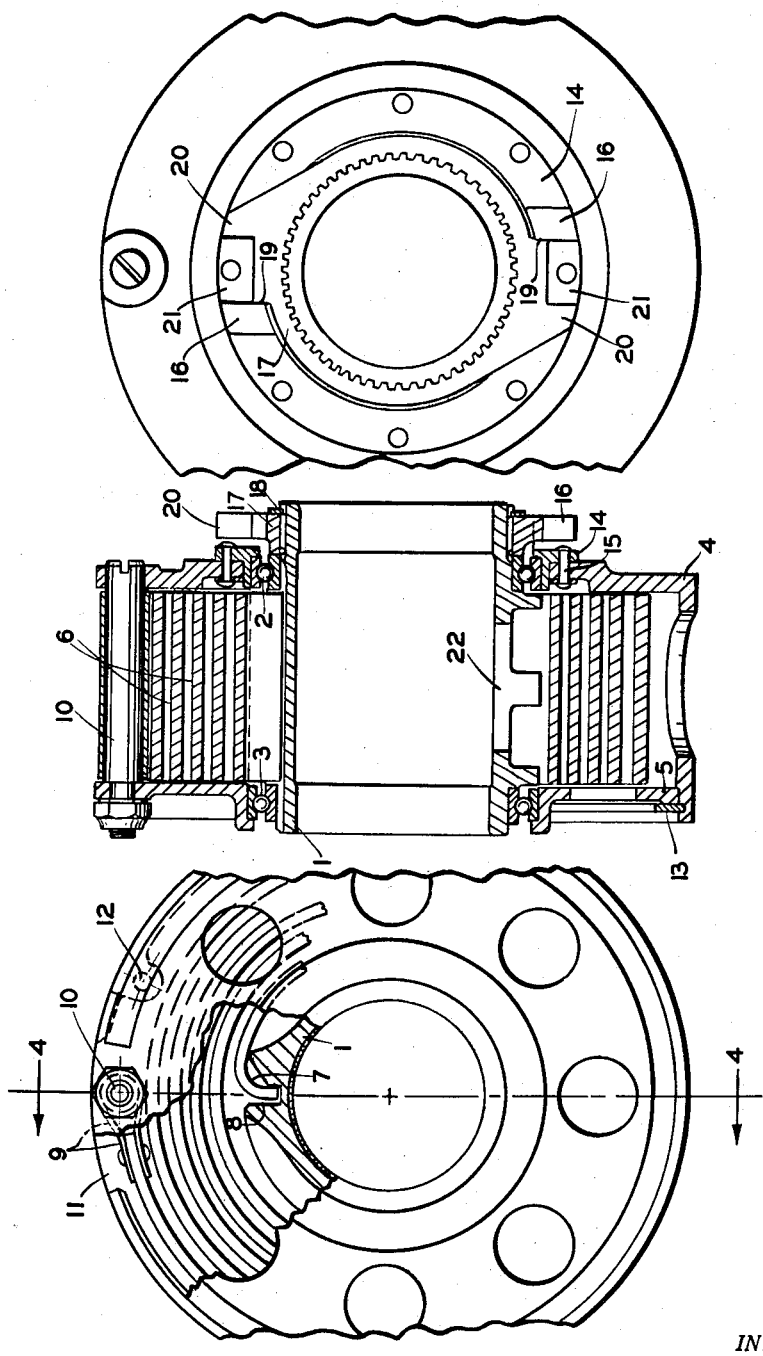
INVENTOR.
LEONARD OCHTMAN
BY
ATTORNEY United States Patent Office 2,862,374
Patented Dec. 2, 1958

2,862,374

TORQUE LIMITING DEVICE

Leonard Ochtman, Ridgewood, N. J., assignor to Bendix Aviation Corporation, Teterboro, N. J., a corporation of Delaware Application April 5, 1957, Serial No. 650,981

4 Claims. (Cl. 64—27)

The present invention relates to a torque limiting device and more particularly to such a device designed for use with a remotely controlled disconnect and reconnect apparatus of a type disclosed and claimed in U. S. Patent No. 2,706,548 granted April 19, 1955 to Norman B. Murphy and assigned to Bendix Aviation Corporation.

An object of the invention is to provide a novel device to limit the torque applied therethrough.

Another object of the invention is to provide a novel torque limiting device for use in connection with an automatic steering system for aircraft, for example, whereby a torque not in excess of a predetermined value may be applied to a remotely positioned cable carrying and operating a servo pulley.

Another object of the invention is to provide a novel device to limit the torque, and consequently the cable force which may be exerted by an automatic pilot servo on surface control cables of an aircraft.

Another object of the invention is to provide a novel and compact torque limiting device, including a single spring member adapted to be preset to limit the torque applied therethrough in opposite senses.

These and other objects and features of the invention are pointed out in the following description in terms of the embodiment thereof which is shown in the accompanying drawing. It is to be understood, however, that the drawing is for the purpose of illustration only and is not defined as a definition of the limits of the invention, reference being had to the appended claims for this purpose.

In the drawings:

Figure 1 is a sectional view of the device taken along the lines 1—1 of Figure 2 and looking in the direction of the arrows and with the torque limiting spring not shown.

Figure 2 is a fragmentary sectional view of Figure 1 taken along the lines 2—2 and looking in the direction of the arrows.

Fig. 3 is a fragmentary end view of the torque limiting spring casing with parts broken away to show the operative connections of the torque spring.

Figure 4 is a sectional view of Figure 3 taken along the line 4—4 and showing the spring assembly.

Figure 5 is a fragmentary end view of the opposite end of the torque limiting spring casing.

Referring to the drawing of Figures 3, 4 and 5 there is shown the construction of the self-contained, spring torque limiter.

Hollow arbor 1 carries ball bearings 2, 3 upon which are mounted respectively spring housing 4 and cover 5. Within the housing is shown a flat-coil torsion spring 6, (one or more springs may be used). The inner end of the spring is hooked as at 7, to engage slot 8 in arbor 1. The outer end of the spring carries a loop 9, fitting around anchor pin 10 which is fastened in cover 5 and extends through the end wall of housing 4. The circumferential wall of the housing has a gap 11, extending on both sides of the pin, to permit the spring loop to be located as close as practicable to the periphery and thus conserve diametral space. The cover is positioned and held with respect to the housing by pin 12. Snap ring 13, fitted in a groove in the housing bore, retains the cover.

Driving plate 14 is fastened to the face of housing 4 by rivets 15, and is shown interposed between the housing and ball bearing 2. The driving plate carries two lugs 16, 16, disposed 180 degrees apart. The adjacent end of arbor 1 carries driving ring 17, mounted on splines and retained by snap ring 18. The driving ring has two stop surfaces 19, 19, which engage lugs 16, 16. It also has two lugs 20, 20, corresponding to those on driving plate 14. Thus when the stop surfaces are held in contact with lugs 16 by spring action, there are diametrically opposite identical spaces 21, 21 between the lugs on the driving plate and those on the driving ring. These spaces accommodate the operating fingers, as described later.

As normally adjusted prior to installation, the spring is wound up to a specified value of torque. To facilitate this, the wall of arbor 1 is provided with slot 22. After assembly and before mounting driving ring 17, the device may be mounted on a spindle having a retractable key. With the spindle held stationary and the key engaged in slot 22, the spring may be wound up by rotating the housing. When the desired torque value is reached, ring 17 is slipped in place on its splines, selecting a position such that the stop surfaces closely match the lugs on plate 14. Upon release of the housing, the spring force holds the stop surfaces against these lugs. The device is thus preloaded to a definite torque value, and will drive as a solid unit at torque loads below that amount.

Referring now to the drawing of Figure 1, there is shown an application of the torque limiter to a disconnect mechanism 32 for an automatic pilot servo and which disconnect mechanism may be of the type described and claimed in U. S. Patent No. 2,706,548 granted April 19, 1955 to Norman B. Murphy and assigned to Bendix Aviation Corporation. The torque limiter is mounted so that its arbor can turn freely on output torque tube 31 of disconnect mechanism 32. Driving member 33 is mounted on splines on torque tube 31 and two diametrically opposite fingers 34, 34 which enter respectively spaces 21, 21 of the torque limiter of Figure 5. Each finger is closely fitted between a lug 16 on driving plate 14 and the corresponding lug 20 on driving ring 17. Driven member 35, on which is mounted cable pulley assembly 36, has also two diametrically opposite fingers 37, 37 which similarly enter spaces 21, 21 of the torque limiter. Each of fingers 37 is also closely fitted between a lug 16 and a lug 20. Thus when torque is applied through tube 31 up to the preloaded value for which the limiter is adjusted, a solid drive is established to the cable pulley with a practical minimum of free play at the fingers.

The fingers of driven member 35 are external of those of driving member 33, and concentrically disposed so that these members can rotate with respect to each other without interference. If the torque load on the cable pulley exceeds the preloaded value of the limiter, applied torque through tube 31 will cause additional wind-up of the limiter spring 6. There is then relative rotation between driving member 33 and driven member 35, such that plate 14 and ring 17 are displaced and stop surfaces 19 move away from lugs 16.

This action occurs regardless of the direction of rotation of the torque tube and pulley with respect to the direction of wind-up of the torque limiter spring 6. For one direction of rotation, if the pulley load is restraining rotation of the limiter housing by bearing against the lugs on plate 14, the torque tube acting through member 33 will apply torque to driving ring 17 and thus to the limiter arbor. The action is to move stop surfaces 19 on ring 17 away from the lugs on plate 14, and thus wind-up the spring an additional amount. In this case there is no relative rotation between the limiter arbor and the torque tube.

For the opposite direction of rotation, the pulley load will restrain rotation of the limiter arbor by bearing against the lugs on ring 17. The torque tube acting through member 33 must then apply torque to driving plate 14 and thus to the limiter housing. The same action results, as the lugs on plate 14 must move away from the stop surfaces on ring 17, winding up the spring. In this case relative rotation occurs between the torque tube and the limiter arbor.

As normally made, the spring 6 would be so proportioned that, for a desired load capacity, the major part of the wind-up would take place when setting the limiter to the preload value. There would then be an acceptable moderate increase in torque when the limiter is deflected beyond its preloaded position, within the normal range of movement.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A torque limiter mechanism comprising an arbor, a casing rotatably mounted on the arbor, a flat torsion spring coiled about the arbor and having one end secured in the arbor and the other end secured to the casing, a driving plate affixed to the casing, a driving ring carried by the arbor and engaging the driving plate under a predetermined torque applied by the spring, a first lug projecting from the driving plate and a second lug projecting from the driving ring, the first lug being arranged in spaced relation to the second lug, a driving member rotatably mounted in the arbor, a driven member rotatably mounted on the driving member, a first finger projecting from the driving member, a second finger projecting from the driven member, the first and second fingers positioned intermediate the first and second lugs and arranged so that one finger cooperates with one lug and the other finger with the other of said lugs so that said driving member may drive said driven member directly through the driving ring and plate under normal torque conditions, said ring and plate arranged to disengage under a force applied by said first finger to one of said lugs upon the torque applied by the driving member exceeding the predetermined torque applied by the spring irrespective of the direction of application of the torque by the driving member.

2. A torque limiter mechanism comprising an arbor, a casing rotatably mounted on the arbor, a flat torsion spring coiled about the arbor and having one end secured in the arbor and the other end secured to the casing, a driving plate affixed to the casing, a driving ring carried by the arbor and engaging the driving plate under a predetermined torque applied by the spring, a first lug projecting from the driving plate and a second lug projecting from the driving ring, the first lug being arranged in spaced relation to the second lug, a driving member rotatably mounted in the arbor, a driven member including a pulley assembly rotatably mounted on the driving member, a first finger projecting from the driving member, a second finger projecting from the driven member, said first and second fingers operatively positioned between the first and second lugs in the space therebetween and so arranged that upon application of a torque to any one of said members in excess of the predetermined torque applied by the spring said ring and plate disengage so as to limit the torque applied therethrough.

3. A torque limiter mechanism comprising an arbor, a casing rotatably mounted on and movable relative to the arbor, spring means mounted in the casing and operatively connected between the casing and arbor so as to apply a predetermined torque thereto, engageable means carried by the casing and arbor to limit the movement of the casing relative to the arbor under said predetermined torque, a first lug means carried by the casing and a second lug means carried by the arbor, the first lug means being arranged in spaced relation to the second lug means, a driving member rotatably mounted in the arbor, a driven member rotatably mounted on the driving member, a first finger projecting from the driving member, a second finger projecting from the driven member, the first and second fingers positioned intermediate the first and second lug means and arranged so that one finger cooperates with one lug means and the other finger with the other of said lug means so that said driving member may drive said driven member directly through the first and second lug means under normal torque conditions, said engageable means arranged to disengage under a force applied by said first finger to one of said lugs upon the torque applied by the driving member exceeding the predetermined torque applied by the spring means irrespective of the direction of application of the torque by the driving member.

4. A torque limiter mechanism comprising an arbor, a casing rotatably movable relative to the arbor, spring means mounted in the casing and operatively connected between the casing and arbor so as to apply a predetermined torque thereto, engageable means carried by the casing and arbor to limit the movement of casing relative to the arbor under said predetermined torque, a first lug means carried by the casing and a second lug means carried by the arbor, the first lug means being arranged in spaced relation to the second lug means, a driving member rotatably mounted in the arbor, a driven member rotatably mounted on the driving member, a first finger projecting from the driving member, a second finger projecting from the driven member, the first and second fingers positioned intermediate the first and second lug means in the space therebetween and so arranged that upon application of a torque to any one of said members in excess of the predetermined torque applied by the spring means said engageable means disengages so as to effectively limit the torque applied through said lug means irrespective of the direction of application of said torque.

References Cited in the file of this patent

UNITED STATES PATENTS

| | | |
|---|---|---|
| 2,521,759 | Sorensen | Sept. 12, 1950 |
| 2,618,137 | White | Nov. 18, 1952 |

FOREIGN PATENTS

| | | |
|---|---|---|
| 577,489 | Great Britain | May 21, 1946 |